USO11775982B2

(12) United States Patent
de Sousa Moura et al.

(10) Patent No.: US 11,775,982 B2
(45) Date of Patent: Oct. 3, 2023

(54) AUGMENTED INTELLIGENCE ASSISTANT FOR AGENTS

(71) Applicant: Accenture Global Solutions Limited, Dublin (IE)

(72) Inventors: Paulo Victor de Sousa Moura, Recife (BR); Daniel Gonzalez, São Paulo (BR); Roberto Frossard, São Paulo (BR); Daniel Kalil Franulovic, São Paulo (BR); Bruno Picosse, São Paulo (BR)

(73) Assignee: Accenture Global Solutions Limited, Dublin (IE)

( * ) Notice: Subject to any disclaimer, the term of this patent is extended or adjusted under 35 U.S.C. 154(b) by 419 days.

(21) Appl. No.: 16/285,684

(22) Filed: Feb. 26, 2019

(65) Prior Publication Data

US 2019/0266611 A1     Aug. 29, 2019

Related U.S. Application Data

(60) Provisional application No. 62/635,293, filed on Feb. 26, 2018.

(51) Int. Cl.
    *G06Q 30/016*     (2023.01)
    *G06N 3/08*     (2023.01)

(52) U.S. Cl.
    CPC .............. *G06Q 30/016* (2013.01); *G06N 3/08* (2013.01)

(58) Field of Classification Search
CPC .... G06Q 30/016; G06Q 10/107; G06Q 30/02; G06Q 30/0201; G06Q 30/0202; G06Q 30/0241; G06Q 30/0255; G06Q 30/0269; G06Q 30/06; G06Q 30/0251; H04M 3/5166; H04M 3/527; H04M 7/0045; H04M 2201/18; H04M 2203/408; H04M 2203/556; H04M 3/5183; G06F 16/3329;

(Continued)

(56) References Cited

U.S. PATENT DOCUMENTS 9,519,936 B2    12/2016    Vijayaraghavan
10,417,643 B2 *    9/2019    Sri ....................... G06Q 30/016
                                                                                                                                                         705/26

(Continued)

FOREIGN PATENT DOCUMENTS

CA            2995929 A1 *    9/2018    ........... G06F 40/284

*Primary Examiner* — Lynda Jasmin
*Assistant Examiner* — Kimberly L Evans
(74) *Attorney, Agent, or Firm* — Fish & Richardson P.C.

(57) ABSTRACT

Methods, systems, and apparatus, including computer programs encoded on a computer storage medium, for assisting an agent in providing support to a customer. The methods, systems, and apparatus include actions of obtaining interaction information regarding an interaction between a customer and an agent, identifying the customer from the interaction information, aggregating the information regarding the customer from multiple sources, determining an intent of the customer from the interaction information and the aggregated information, determining a sentiment of a customer from the interaction information and the aggregated information, determining a particular action to indicate to the agent based on the aggregated information, the intent, and the sentiment, and generating an interface to provide the agent based at least on the particular action.

17 Claims, 3 Drawing Sheets

(58) Field of Classification Search
CPC .............. G06F 16/3335; G06F 3/04842; G06F 40/129; G06F 40/232; G06F 40/242; G06F 40/295; G06F 40/35; G06F 40/284; G07F 17/3244; G07F 17/3255; G07F 17/3262; G07F 17/3269; G06N 3/04; G06N 3/08
USPC ....... 705/1.1, 26, 304, 7.31, 7.29, 7; 700/29; 709/206; 382/118; 704/235, 2
See application file for complete search history.

(56) References Cited

U.S. PATENT DOCUMENTS

| | | | | |
|---|---|---|---|---|
| 2009/0248599 | A1* | 10/2009 | Hueter | G06Q 30/0631 706/15 |
| 2010/0094788 | A1* | 4/2010 | Schafer | G06N 3/0481 700/29 |
| 2013/0191520 | A1 | 7/2013 | Khouri et al. | |
| 2013/0262320 | A1* | 10/2013 | Makanawala | G06Q 30/016 705/304 |
| 2013/0282430 | A1* | 10/2013 | Kannan | G06Q 30/02 705/7.29 |
| 2014/0143018 | A1* | 5/2014 | Nies | G06Q 30/0201 705/7.29 |
| 2015/0235240 | A1* | 8/2015 | Chang | H04M 3/5166 705/7.29 |
| 2016/0042419 | A1* | 2/2016 | Singh | G06Q 30/0631 705/26.41 |
| 2016/0132892 | A1* | 5/2016 | Zhou | G06Q 30/016 705/304 |
| 2016/0239848 | A1* | 8/2016 | Chang | G06Q 30/016 705/7.31 |
| 2017/0116177 | A1* | 4/2017 | Walia | H04M 7/0045 704/2 |
| 2017/0186018 | A1* | 6/2017 | Nandi | G06Q 30/016 705/304 |
| 2017/0316438 | A1* | 11/2017 | Konig | G06Q 30/016 705/7.29 |
| 2018/0035938 | A1* | 2/2018 | el Kaliouby | G06Q 10/101 382/118 |
| 2019/0149488 | A1* | 5/2019 | Bansal | G06F 9/453 709/206 |
| 2021/0158234 | A1* | 5/2021 | Sivasubramanian | G10L 15/26 704/235 |

* cited by examiner

AUGMENTED INTELLIGENCE ASSISTANT FOR AGENTS

CROSS-REFERENCE TO RELATED APPLICATION

The present disclosure is related to, and claims benefit of, U.S. Provisional Patent Application No. 62/635,293, titled "AUGMENTED INTELLIGENCE ASSISTANT FOR AGENTS," which was filed on Feb. 26, 2018, and the entire contents of which are incorporated by reference into the present disclosure.

TECHNICAL FIELD

This disclosure generally relates to intelligent assistance.

BACKGROUND

Customers that purchase an item from a company may sometimes contact the company for support. For example, a customer that purchases a computer from a particular company may call that company to ask for help when the computer is malfunctioning. A customer support agent of the company may then attempt to help the customer resolve the customer's issue.

SUMMARY

In general, an aspect of the subject matter described in this specification may involve a process for assisting an agent in providing support to a customer. Customer support agents for a company may interact with customers of the company to provide support. For example, customers may call a support phone number of the company and be telephonically connected with a customer support agent. In another example, a customer may access a webpage of the company to initiate a text-based web chat with the company.

The customer support agents may be initially unaware of any information regarding the customer until the customer directly tells the customer support agents. Accordingly, the customer support agent may be unaware whether the customer has previously complained to the company and whether the customer has publicly complained in a social media network. Additionally, the customer support agent may need to ask the customer for an order number, type that order number into a system that stores order information, and then wait for the system to provide the order information. The customer support agent may then need to decide how best to provide support to the customer based on the order information.

A system may provide assistance to an agent so that the agent may better provide support to customers. The system may automatically obtain information related to the customer from a variety of different sources including a current interaction between the customer and agent, social networks, an order information database, and a complaint history database. The system may determine an intent and sentiment of the customer from the information, determine an action that is likely to assist the agent, and, in response, provide an indication of that action to the agent to use in their interaction with the customer.

According to an innovative aspect of the subject matter described in this application, a method for assisting an agent in providing support to a customer may include the actions of obtaining interaction information regarding an interaction between a customer and an agent, identifying the customer from the interaction information, aggregating the information regarding the customer from multiple sources, determining an intent of the customer from the interaction information and the aggregated information, determining a sentiment of a customer from the interaction information and the aggregated information, determining a particular action to indicate to the agent based on the aggregated information, the intent, and the sentiment, and generating an interface to provide the agent based at least on the particular action.

Other embodiments of this aspect include corresponding systems, apparatus, and computer programs recorded on computer storage devices, each configured to perform the operations of the methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
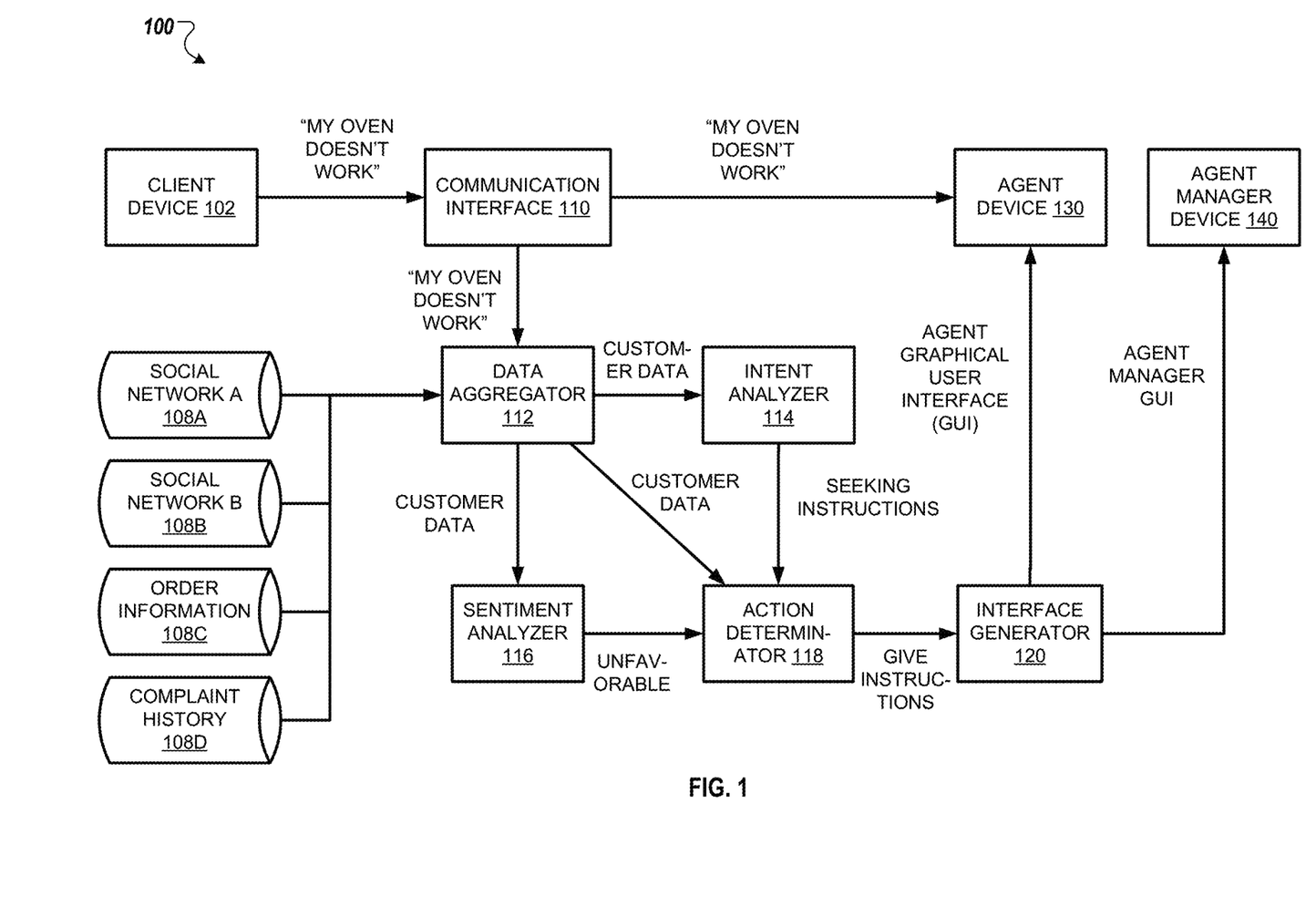
FIG. 1 illustrates an example block diagram of a system for assisting an agent in providing support to a customer.

FIG. 1 illustrates an example block diagram of a system 100 for assisting an agent in providing support to a customer. The system 100 may include a client device 102 used by a customer, a data aggregator 112 that aggregates information regarding the customer from various data sources 108A, 108B, 108C, 108D (collectively referred to as 108A-D), an intent analyzer 114 that determines an intent of the customer, a sentiment analyzer 116 that determines a sentiment of the customer, an action determinator 118 that determines an action to indicate to a customer support agent, an interface generator 120 that generates an interface to provide the customer support agent, an agent device 130 used by the customer support agent, an agent manager device 140 used by a manager of the customer support agent, and a communication interface 110 that provides communication between the client device 102 and the agent device 130.

The client device 102 be a computing device that a customer uses to communicate with a customer support agent. For example, the client device 102 may be a phone that the customer uses to dial a support phone number for a company of the customer support agent. In another example, the client device 102 may be a smart phone, tablet, laptop, or desktop computer that the customer can use to browse to a website of a company and request text-based support through a web-based text chat.

The communication interface 110 may enable interaction between the customer and the customer support agent while at the same time providing information regarding the interaction, also referred to as interaction information, to the data aggregator 112. For example, the communication interface 110 may provide audio corresponding to a call between the client device 102 and the agent device 130 to the data aggregator 112. In another example, the communication interface 110 may provide text of messages sent in a text-based web chat between the client device 102 and the agent device 130 to the data aggregator 112. In yet another example, the communication interface 110 may automatically transcribe audio for a phone call between the client device 102 and the agent device 130 and provide text for the transcription to the data aggregator 112.

The data aggregator 112 may aggregate information regarding a customer, using the client device 102, from various data sources. For example, the data aggregator 112 may aggregate information on a customer "John Doe" from a first social network 108A, a second social network 108B, an order information database 108C that stores information on previously placed orders, and a complaint history database 108D that stores information regarding complaints previously received from customers.

The data aggregator 112 may aggregate information regarding the customer based on initially identifying the customer from the interaction information received from the communication interface 110. For example, the data aggregator 112 may receive a transcription including the text "This is John Doe," in response, determine that the customer is a customer with the name "John Doe," and then aggregate information regarding people with the name "John Doe." In another example, the data aggregator 112 may receive information that indicates that a customer initiated a web-based text chat while logged into an account of a user named "John Doe" on a social network and, in response, identify the customer from information regarding the account in the social network, and then aggregate information from other social networks, the order information database 108C, and the complaint history database 108D based on the identity of the customer.

The intent analyzer 114 may obtain the aggregated information and interaction information from the data aggregator 112 and determine an intent of the customer for the interaction. For example, the intent analyzer 114 may determine from the intent information that the customer has said "My oven doesn't work" and from the aggregated information determine that the customer has publicly posted "Company X has terribly designed products. I can't even figure out how to turn on my oven" and, in response, determine from "My oven doesn't work" from the customer in the interaction and "I can't even figure out how to turn on my oven" from the social network that a customer's intent is to get instructions on how to turn on the oven. An intent may refer to a result that a customer would like from the interaction. For example, intents may include one or more of, cancel an order, get a shipping status of an order, return an order, get help on using an item, etc.

The sentiment analyzer 116 may obtain the aggregated information and interaction information from the data aggregator and determine a sentiment of the customer. For example, the sentiment analyzer 116 may determine from, a tone of voice, selection of vocabulary, length of messages in a phone interaction through the communication interface 110 and from publicly posted social network messages whether a customer has a favorable, unfavorable, or neutral sentiment about the company. A sentiment of a customer may refer to a feeling that the customer has regarding the company. Additionally or alternatively, a sentiment may refer to a mood of a customer, e.g., happy, angry, sad, etc.

The action determinator 118 may determine an action to indicate to a customer support agent based on the aggregated information, the intent, and the sentiment. For example, the action determinator 118 may receive aggregated information from the data aggregator 112 that indicates that the customer has been researching other ovens since purchasing the oven from the company, an intent indicator from the intent analyzer 114 that indicates that the customer intends to seek instructions on using their oven, and a sentiment indicator from the sentiment analyzer 116 indicating that the customer is unfavorable with the company, and, in response, determine to suggest a partial credit on the oven. In another example, the action determinator 118 may determine that a customer has been researching refrigerators, has a favorable sentiment about the company, and is seeking instructions on using their oven, and, in response, determine to provide a discount on a refrigerator. In yet another example, the action determinator 118 may suggest a new replacement based on aggregated information that indicates that the customer has made numerous complains both directly to the company and on social networks, an intent indicator that indicates the customer intends to return the item, and a sentiment indicator that indicates the customer is unhappy with the company.

In some implementations, the action determinator 118 may determine an action to indicate to the support agent based on a criticality score of the customer. The criticality score may represent a likely impact of the customer on future business. For example, the action determinator 118 may determine from the aggregated information that the customer has placed numerous large value orders and, in response, determine a criticality score that indicates a high impact of future business. In another example, the action determinator 118 may determine from the aggregated information that the customer has many followers in a social network and, in response, determine a criticality score that indicates a high impact of future business. The action determinator 118 may determine actions that have a greater immediate cost based on criticality scores that represent a high likely impact of the customer on future business. For example, in response to a determination of a high likely impact of the customer on future business instead of a low likely impact of the customer on future business, the action determinator 118 may indicate to provide a complete refund instead of a partial refund or to ship a complimentary new item instead of requesting that the customer ship back an item and wait for repairs.

Additionally or alternatively, the action determinator 118 may also determine other information to provide the customer support agent to assist in supporting the customer. For example, the action determinator 118 may determine from the interaction information that the user has provided an order number and, in response, determine to provide order details to the agent without the agent requesting for those order details. For example, the customer may say "Order 1234," the action determinator 118 may detect that text in the interaction information and, in response, determine to provide an order placement date, list of items in the order, shipping address, etc. for the order without the agent providing a request for information subsequent to the customer saying "Order 1234."

The interface generator 120 may generate an interface to provide the agent device 130 to assist the customer support agent. For example, the interface generator 120 may generate a graphical user interface that includes the text "Suggest offering a promotion on a new refrigerator" or "Suggest providing a 50% credit." In another example, the interface generator 120 may generate a graphical user interface that includes order details for the three most recently placed orders by the customer before the customer specifies a particular order number of a particular item and a most recent post about the company in a social network made by the customer.

The agent device 130 may be a computing device used by the customer support agent to provide support to customers. For example, the agent device 130 may be a smart phone, a tablet, a laptop, or a desktop computer. The agent device 130 may receive one or more interfaces from the interface generator 120 and provide the interface to the customer support agent. For example, the agent device 130 may receive a graphical user interface including the text "Suggest offering a promotion on a new refrigerator" and, in response, display the graphical user interface.

The interface generator 120 may additionally or alternatively provide an interface to an agent manager device 140. The interface for the agent manager device 140 may indicate information regarding one or more interactions between a customer and an agent. For example, the interface for the agent manager device 140 may be a graphical dashboard that indicates a sentiment for fifty interactions between customers and agents. An agent manager using the interface may then use the agent manager device 140 to supervise interactions. For example, the agent manager device 140 may display that a sentiment for a particular interaction is "Furious," an agent manager may be able to interact with a control, e.g., click on or select, corresponding to the particular interaction displayed on the agent manager device 140, and, in response, the agent manager device 140 may be added to the particular interaction to defuse the interaction.

The agent manager device 140 may be a computing device used by the agent manager to supervise agents. For example, the agent manager device 140 may be a smart phone, a tablet, a laptop, or a desktop computer.

Additionally or alternatively, the system 100 may learn from interactions to improve one or more of intent analysis, sentiment analysis or action determination. For example, the system 100 may receive feedback in the form of survey responses from customers after an interaction with an agent has ended and, in response to positive survey responses, weight those analysis and determinations more and, in response to negative survey responses, weight those analysis and determinations less.

Figure 2:
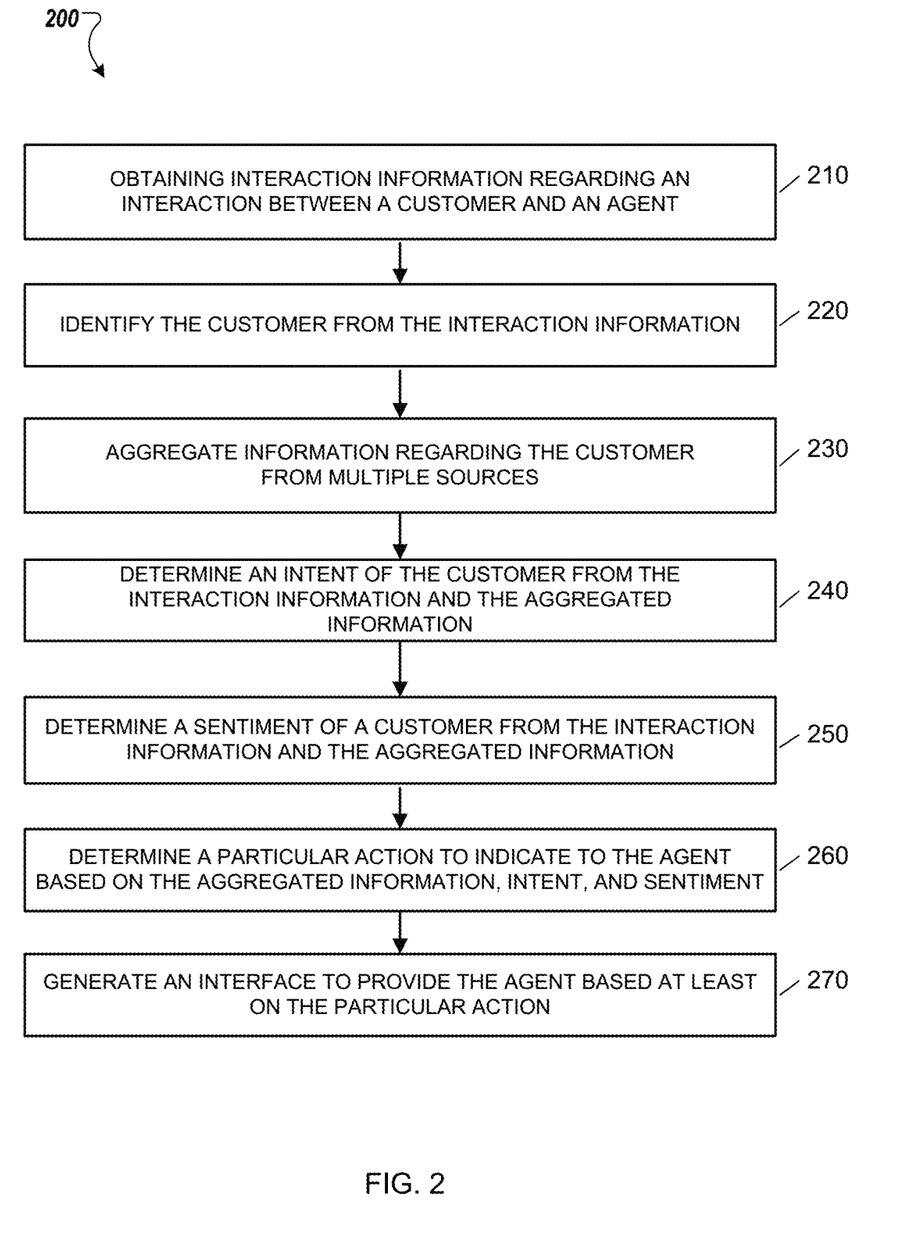
FIG. 2 illustrates a flowchart of an example process for assisting an agent in providing support to a customer.

FIG. 2 illustrates a flowchart of an example process 200 for assisting an agent in providing support to a customer. The process 200 may be performed by various systems, and is described below in an example as being performed by system 100 shown in FIG. 1.

The process 200 includes obtaining interaction information regarding an interaction between a customer and an agent (210). In some implementations, obtaining interaction information regarding an interaction between a customer and an agent includes obtaining, as the interaction information, one or more of an audio representation of speech from the customer, a transcription of a call with the customer, or text entered by the customer. For example, the data aggregator 112 may obtain an audio representation of "where is my order" from a user logged into the user's account in Social Network A. In another example, the data aggregator 112 may obtain text of "where is my order" sent by the customer through a web-based text chat. In yet another example, the data aggregator 112 may receive a transcription of "where is my order" for a phone call with the customer.

The process 200 includes identifying the customer from the interaction information (220). In some implementations, wherein identifying the customer from the interaction information includes identifying an account that is logged in according to the interaction information and identifying the customer from the account that was identified. For example, the data aggregator 112 may identify the customer from interaction information indicating that the user is logged into an account for "John Doe" that the user is "John Doe." In another example, the data aggregator 112 may identify the customer from a transcription of a phone call where the customer says "my name is John Doe." In yet another example, the data aggregator 112 may identify the customer from the customer typing in an order number into a web-based text chat.

The process 200 includes aggregating information regarding the customer from multiple sources (230). For example, the data aggregator 112 may aggregate social network data from social networks 108A and 108B, order information from order information database 108C, and complaints from complaint history database 108D.

The process 200 includes determining an intent of the customer from the interaction information and the aggregated information (240). For example, the intent analyzer 114 may analyze the aggregated information to determine that the customer would like a shipping status update based on a transcription of "where is my order."

The process 200 includes determining sentiment of the customer from the interaction information and the aggregated information (250). For example, the sentiment analyzer 116 may analyze the aggregated information to determine that the customer has a favorable opinion of the company based on a most recent post about the company made by the customer being "Looking forward to getting my new oven by Company X!"

In some implementations, determining a sentiment of a customer from the interaction information and the aggregated information includes providing the interaction information and the aggregated information to a neural network and receiving a classification from the neural network as to the sentiment of the customer, where the neural network is trained to classify sentiments based on previous interaction information of customers and aggregated information of the customers. For example, the sentiment analyzer 116 may be trained with sets of previous interaction information and previous aggregated information, where each set is labeled with a classification of a sentiment.

The process 200 includes determining a particular action to indicate to the agent based on the aggregated information, the intent, and the sentiment (260). For example, the action determinator 118 may determine to indicate a delivery date for an order and a promotion code for a discount on a next order.

In some implementations, determining a particular action to indicate to the agent based on the aggregated information, the intent, and the sentiment includes providing the aggregated information, the intent, and the sentiment to a neural network, and receiving an indication of the particular action from the neural network, where the neural network is trained to determine an action to perform based on aggregated information of customers, intents of the customers, sentiments of the customers, previous actions performed by agents for the customers, and outcomes of the previous actions.

For example, an intent determined by the intent analyzer 114, the aggregated information from the data aggregator 112, and the sentiment determined by the sentiment analyzer 116 may be provided to the action determinator 118, where the action determinator 118 is a neural network that is trained to determine an action to perform based on, for thousands of previous interactions by various customers and various agents, aggregated information of the customers, intents of the customers, sentiments of the customers, previous actions performed by agents for the customers, and outcomes of the previous actions.

In example further details, the outcome of the previous action may be a binary classification that corresponds to positive or negative and the action determinator 118 may be trained with training sets where inputs are aggregated information, intents, sentiments, and outcomes of the previous actions and outputs are previous actions. When the action determinator 118 is later used to determine the particular action, the aggregated information, the intent, and the sentiment may be provided to the action determinator 118 along with an indication of an outcome that is positive.

The process 200 includes generating an interface to provide the agent based at least on the particular action (270). For example, the interface generator 120 may generate an interface that includes the text "The estimated delivery date is Feb. 22, 2018. We apologize for the delay, and would like to offer you 10% off your next order." In the example, the interface may be presented to the agent for the agent to then read the text to the customer.

In some implementations, the process 200 includes determining a criticality score of the customer based on a number of connections that the customer has in a social network according to the aggregated information, where determining the particular action is further based on the criticality score of the customer. For example, the action determinator 118 may determine that the customer has many connections on a social network, in response determine a criticality score for the customer that indicates a high likely impact of the customer on future business, and, in response, determine to provide the customer 25% off their next order instead of 10%. In another example, the action determinator 118 may determine that the customer has few connections on all social networks, in response determine a criticality score for the customer that indicates a low likely impact of the customer on future business, and, in response, determine to provide the customer 10% off their next order instead of 25%.

Figure 3:
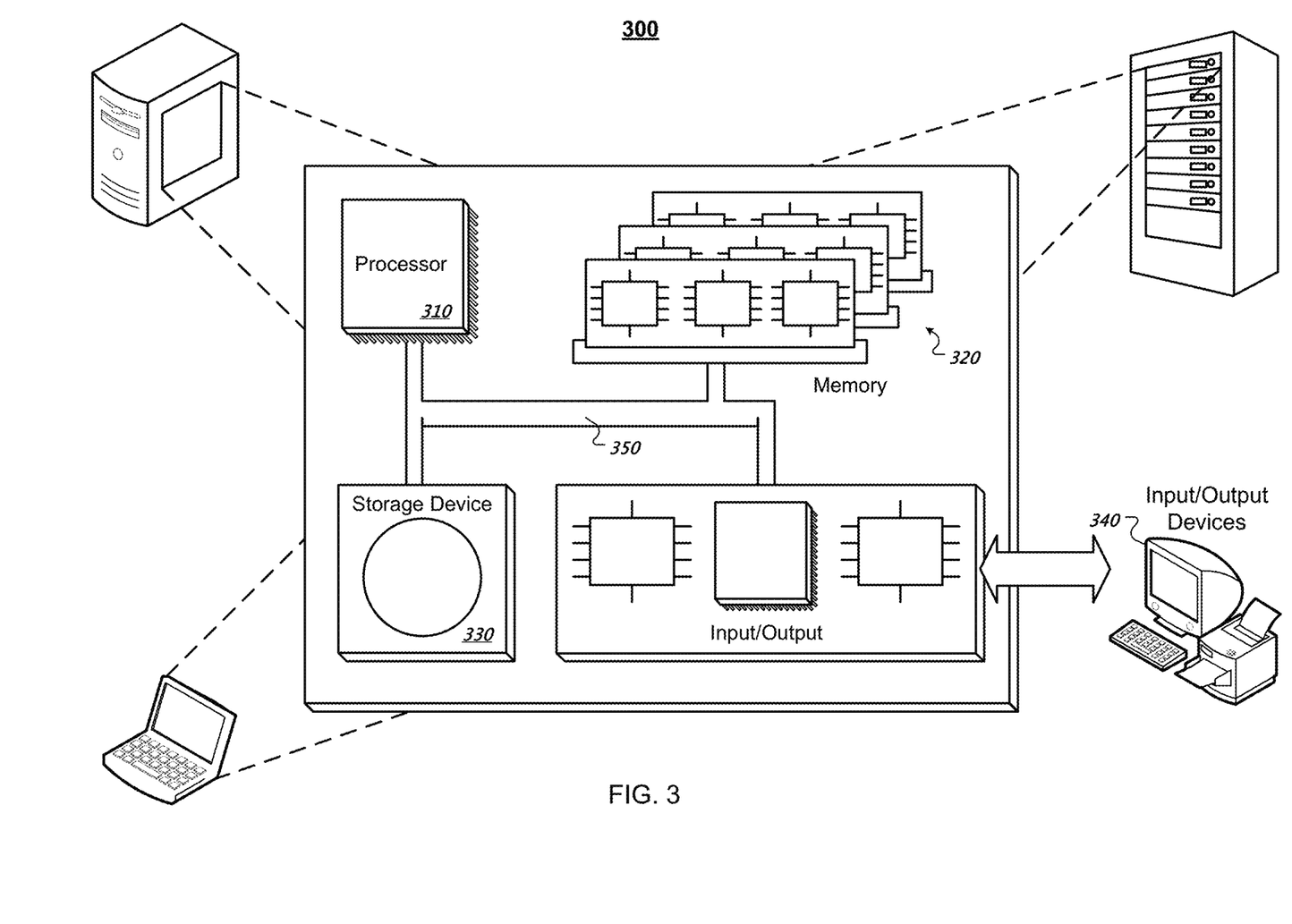
FIG. 3 illustrates a schematic diagram of an exemplary generic computer system.

FIG. 3 illustrates a schematic diagram of an exemplary generic computer system 300. The system 300 includes a processor 310, a memory 320, a storage device 330, and an input/output device 340. Each of the components 310, 320, 330, and 340 are interconnected using a system bus 250. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, a solid state drive, an optical disk device, a tape device, universal serial bus stick, or some other storage device.

The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

What is claimed is:

1. A computer-implemented method, comprising:
   collecting, from a database, (i) aggregated information of customers, (ii) intents of the customers that identify specific customer support services that the customers received from past interactions with customer support agents of a company, from among multiple support services that the customer support agents of the company are able to provide to the customers, (iii) sentiments of the customers that reflect an automatically determined mood or opinion that the customers holds about the company, (iv) previous actions performed by the customer support agents for the customers, and (v) outcomes of the previous actions performed by the customer support agents for the customers that reflect whether the customers were satisfied by the previous actions performed by the customer support agents for the customers;
   creating training sets that, for each of the customers, include (i) information about the customer, (ii) an intent of the customer, (iii) a sentiment of the customer, (iv) a previous action performed by an agent for the customer, and (v) an outcome of the previous action that was performed by the agent for the customers;
   training, using the training sets, a neural network to output a recommendation to be performed by a given agent for use with a given customer, based an input that includes (i) for input information about a given customer, (ii) an input intent of the given customer that identifies a specific customer support service that the given customer intends to receive from a customer support agent of the company, from among multiple support services that the customer support agent is able to provide to the given customer, and (iii) an input sentiment of the given customer that reflects an automatically discerned mood or opinion that the given customer holds about the company, wherein training the neural network comprises assigning a higher weight to recommended actions that are associated with positive outcomes in training sets, and assigning a lower weight to recommended actions that are associated with negative outcomes in the training sets;
   obtaining interaction information regarding an interaction between a customer and an agent;
   while the interaction is occurring, automatically transcribing the interaction information from one format into a different format;
   identifying the customer from the transcribed interaction information;
   aggregating information of the customer from multiple databases, including querying one or more databases that are external to the company and that are not controlled by the company;
   determining, based on the transcribed interaction information and the aggregated information of the customer, an intent of the customer that identifies a particular customer support service that the customer likely intends to receive from the customer support agent of the company, from among the multiple support services that the customer support agent of the company is able to provide to the customer;
   automatically determining, based on the transcribed interaction information and the aggregated information of the customer, a sentiment of the customer that reflects a mood or opinion that the customer holds about the company;
   providing, to the trained neural network, an input feature set that includes (i) the aggregated information of the customer, (ii) the intent of the customer, and (iii) the sentiment of the customer;
   receiving, from the trained neural network based on the input feature set, an output that identifies a particular recommended action to be performed by the agent for the customer; and
   while the interaction is occurring, generating an interface to provide to the agent based at least on the particular recommended action.

2. The method of claim 1, wherein determining a sentiment of a customer from the interaction information and the aggregated information comprises:
   providing the interaction information and the aggregated information to a neural network that, for input interaction information input aggregated information, is trained to provide an output classifications; and
   receiving a classification from the neural network that is trained to provide output classifications as the sentiment of the customer.

3. The method of claim 1, wherein determining a sentiment of a customer from the interaction information and the aggregated information comprises:
   determining from the interaction information and the aggregated information that the customer is angry.

4. The method of claim 1, wherein obtaining interaction information regarding an interaction between a customer and an agent comprises:
   obtaining, as the interaction information, one or more of an audio representation of speech from the customer, a transcription of a call with the customer, or text entered by the customer.

5. The method of claim 1, comprising:
   determining a criticality score of the customer based on a number of connections that the customer has in a social network according to the aggregated information,
   wherein determining the particular action is further based on the criticality score of the customer.

6. The method of claim 1, wherein identifying the customer from the interaction information comprises:
   identifying an account that is logged in according to the interaction information; and
   identifying the customer from the account that was identified.

7. The method of claim 1, wherein aggregating the information regarding the customer from multiple sources comprises:
   aggregating the information regarding the customer from a social network, an order information database, and a complaint history database.

8. The method of claim 1, wherein generating an interface to provide the agent based at least on the particular action comprises:
   generating the interface to include text that indicates the particular action.

9. A system comprising:
   one or more computers and one or more storage devices storing instructions that are operable, when executed by the one or more computers, to cause the one or more computers to perform operations comprising:

collecting, from a database, (i) aggregated information of customers, (ii) intents of the customers that identify specific customer support services that the customers received from past interactions with customer support agents of a company, from among multiple support services that the customer support agents of the company are able to provide to the customers, (iii) sentiments of the customers that reflect an automatically determined mood or opinion that the customers holds about the company, (iv) previous actions performed by the customer support agents for the customers, and (v) outcomes of the previous actions performed by the customer support agents for the customers that reflect whether the customers were satisfied by the previous actions performed by the customer support agents for the customers;

creating training sets that, for each of the customers, include (i) information about the customer, (ii) an intent of the customer, (iii) a sentiment of the customer, (iv) a previous action performed by an agent for the customer, and (v) an outcome of the previous action that was performed by the agent for the customers;

training, using the training sets, a neural network to output a recommendation to be performed by a given agent for use with a given customer, based an input that includes (i) for input information about a given customer, (ii) an input intent of the given customer that identifies a specific customer support service that the given customer intends to receive from a customer support agent of the company, from among multiple support services that the customer support agent is able to provide to the given customer, and (iii) an input sentiment of the given customer that reflects an automatically discerned mood or opinion that the given customer holds about the company, wherein training the neural network comprises assigning a higher weight to recommended actions that are associated with positive outcomes in training sets, and assigning a lower weight to recommended actions that are associated with negative outcomes in the training sets;

obtaining interaction information regarding an interaction between a customer and an agent;

while the interaction is occurring, automatically transcribing the interaction information from one format into a different format;

identifying the customer from the transcribed interaction information;

aggregating information of the customer from multiple databases, including querying one or more databases that are external to the company and that are not controlled by the company;

determining, based on the transcribed interaction information and the aggregated information of the customer, an intent of the customer that identifies a particular customer support service that the customer likely intends to receive from the customer support agent of the company, from among the multiple support services that the customer support agent of the company is able to provide to the customer;

automatically determining, based on the transcribed interaction information and the aggregated information of the customer, a sentiment of the customer that reflects a mood or opinion that the customer holds about the company;

providing, to the trained neural network, an input feature set that includes (i) the aggregated information of the customer, (ii) the intent of the customer, and (iii) the sentiment of the customer;

receiving, from the trained neural network based on the input feature set, an output that identifies a particular recommended action to be performed by the agent for the customer; and while the interaction is occurring, generating an interface to provide to the agent based at least on the particular recommended action.

10. The system of claim 9, wherein determining a sentiment of a customer from the interaction information and the aggregated information comprises:

providing the interaction information and the aggregated information to a neural network that, for input interaction information input aggregated information, is trained to provide an output classifications; and receiving a classification from the neural network that is trained to provide output classifications as the sentiment of the customer.

11. The system of claim 9, wherein determining a sentiment of a customer from the interaction information and the aggregated information comprises:

determining from the interaction information and the aggregated information that the customer is angry.

12. The system of claim 9, wherein obtaining interaction information regarding an interaction between a customer and an agent comprises:

obtaining, as the interaction information, one or more of an audio representation of speech from the customer, a transcription of a call with the customer, or text entered by the customer.

13. The system of claim 9, comprising:

determining a criticality score of the customer based on a number of connections that the customer has in a social network according to the aggregated information, wherein determining the particular action is further based on the criticality score of the customer.

14. The system of claim 9, wherein identifying the customer from the interaction information comprises:

identifying an account that is logged in according to the interaction information; and identifying the customer from the account that was identified.

15. The system of claim 9, wherein aggregating the information regarding the customer from multiple sources comprises:

aggregating the information regarding the customer from a social network, an order information database, and a complaint history database.

16. A non-transitory computer-readable medium storing software comprising instructions executable by one or more computers which, upon such execution, cause the one or more computers to perform operations comprising:

collecting, from a database, (i) aggregated information of customers, (ii) intents of the customers that identify specific customer support services that the customers received from past interactions with customer support agents of a company, from among multiple support services that the customer support agents of the company are able to provide to the customers, (iii) sentiments of the customers that reflect an automatically determined mood or opinion that the customers holds about the company, (iv) previous actions performed by the customer support agents for the customers, and (v) outcomes of the previous actions performed by the customer support agents for the customers that reflect whether the customers were satisfied by the previous actions performed by the customer support agents for the customers;

creating training sets that, for each of the customers, include (i) information about the customer, (ii) an intent of the customer, (iii) a sentiment of the customer, (iv) a previous action performed by an agent for the customer, and (v) an outcome of the previous action that was performed by the agent for the customers;

training, using the training sets, a neural network to output a recommendation to be performed by a given agent for use with a given customer, based an input that includes (i) for input information about a given customer, (ii) an input intent of the given customer that identifies a specific customer support service that the given customer intends to receive from a customer support agent of the company, from among multiple support services that the customer support agent is able to provide to the given customer, and (iii) an input sentiment of the given customer that reflects an automatically discerned mood or opinion that the given customer holds about the company, wherein training the neural network comprises assigning a higher weight to recommended actions that are associated with positive outcomes in training sets, and assigning a lower weight to recommended actions that are associated with negative outcomes in the training sets;

obtaining interaction information regarding an interaction between a customer and an agent;

while the interaction is occurring, automatically transcribing the interaction information from one format into a different format;

identifying the customer from the transcribed interaction information;

aggregating information of the customer from multiple databases, including querying one or more databases that are external to the company and that are not controlled by the company;

determining, based on the transcribed interaction information and the aggregated information of the customer, an intent of the customer that identifies a particular customer support service that the customer likely intends to receive from the customer support agent of the company, from among the multiple support services that the customer support agent of the company is able to provide to the customer;

automatically determining, based on the transcribed interaction information and the aggregated information of the customer, a sentiment of the customer that reflects a mood or opinion that the customer holds about the company;

providing, to the trained neural network, an input feature set that includes (i) the aggregated information of the customer, (ii) the intent of the customer, and (iii) the sentiment of the customer;

receiving, from the trained neural network based on the input feature set, an output that identifies a particular recommended action to be performed by the agent for the customer; and while the interaction is occurring, generating an interface to provide to the agent based at least on the particular recommended action.

17. The medium of claim 16, wherein determining a sentiment of a customer from the interaction information and the aggregated information comprises:

providing the interaction information and the aggregated information to a neural network that, for input interaction information input aggregated information, is trained to provide an output classifications; and receiving a classification from the neural network that is trained to provide output classifications as the sentiment of the customer.

* * * * *

UNITED STATES PATENT AND TRADEMARK OFFICE
CERTIFICATE OF CORRECTION

PATENT NO. : 11,775,982 B2
APPLICATION NO. : 16/285684
DATED : October 3, 2023
INVENTOR(S) : Paulo Victor de Sousa Moura et al.

It is certified that error appears in the above-identified patent and that said Letters Patent is hereby corrected as shown below:

In the Claims

In Claim 1, Column 9, Line 36, delete "(i) for" and insert -- (i) --.

In Claim 9, Column 11, Line 29, delete "(i) for" and insert -- (i) --.

In Claim 16, Column 13, Line 14, delete "(i) for" and insert -- (i) --.

Signed and Sealed this
Fourteenth Day of November, 2023

Katherine Kelly Vidal
*Director of the United States Patent and Trademark Office*